(12) United States Patent
Chen et al.

(10) Patent No.: US 12,556,781 B2
(45) Date of Patent: Feb. 17, 2026

(54) VIDEO GENERATION METHOD, DEVICE AND STORAGE MEDIUM

(71) Applicant: BAIDU.COM TIMES TECHNOLOGY (BEIJING) CO., LTD., Beijing (CN)

(72) Inventors: Miao Chen, Beijing (CN); Weiguo Nie, Beijing (CN); Yudong Zhang, Beijing (CN); Qian Gao, Beijing (CN); Xianjun Xu, Beijing (CN)

(73) Assignee: BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 45 days.

(21) Appl. No.: 18/886,362

(22) Filed: Sep. 16, 2024

(65) Prior Publication Data
US 2025/0016427 A1    Jan. 9, 2025

(30) Foreign Application Priority Data

Oct. 24, 2023   (CN) .......................... 202311387153.1

(51) Int. Cl.
*H04N 21/81* (2011.01)
*H04N 21/234* (2011.01)
*H04N 21/854* (2011.01)

(52) U.S. Cl.
CPC ..... *H04N 21/816* (2013.01); *H04N 21/23424* (2013.01); *H04N 21/854* (2013.01)

(58) Field of Classification Search
None
See application file for complete search history.

(56) References Cited

U.S. PATENT DOCUMENTS 9,888,279 B2 *  2/2018  Ishtiaq ............... H04N 21/2353
10,506,293 B2 * 12/2019  Perinchery ......... H04N 21/4668
(Continued)

FOREIGN PATENT DOCUMENTS

CN    113626637 A    11/2021
CN    116112621 A     5/2023
(Continued)

OTHER PUBLICATIONS

Office Action of Japanese patent application No. JP 2024157477 dated Aug. 12, 2025, 8 pages.
(Continued)

*Primary Examiner* — Mushfikh I Alam
(74) *Attorney, Agent, or Firm* — Brooks Kushman P.C.

(57) ABSTRACT

Disclosed is a video generation method in the fields of deep learning, large models, natural language processing and computer vision. The video generation method includes: obtaining text information to be processed, and segmenting the text information to be processed into sentences to obtain target sentences; selecting video shots matching the target sentences respectively from video shots in a material library as candidate materials corresponding to the target sentences respectively; for the target sentences, performing the following processing respectively: determining a screening method corresponding to a target sentence according to a position of the target sentence in the text information to be processed, selecting a target material for generating a required target video from the candidate materials corresponding to the target sentence according to the screening method; and generating the target video based on the target materials corresponding to the target sentences, respectively.

15 Claims, 5 Drawing Sheets

(56) References Cited

U.S. PATENT DOCUMENTS

| | | | |
|---|---|---|---|
| 11,144,764 B1* | 10/2021 | Sharma | H04N 21/43076 |
| 11,676,385 B1* | 6/2023 | Yuan | G06V 10/462 |
| | | | 382/181 |
| 11,804,044 B1* | 10/2023 | Rose | G06V 20/49 |
| 11,829,717 B1* | 11/2023 | Chen | G06N 3/048 |
| 12,277,766 B2* | 4/2025 | Meng | G10L 25/57 |
| 2005/0149965 A1* | 7/2005 | Neogi | H04N 5/782 |
| | | | 725/14 |
| 2015/0293995 A1* | 10/2015 | Chen | H04N 21/237 |
| | | | 707/706 |
| 2017/0357720 A1* | 12/2017 | Torabi | H04N 21/8405 |
| 2019/0026367 A1 | 1/2019 | Boss et al. | |
| 2022/0086401 A1* | 3/2022 | Hu | H04N 21/2187 |
| 2022/0141503 A1* | 5/2022 | Cui | G06V 10/761 |
| | | | 725/19 |
| 2022/0279202 A1* | 9/2022 | Wang | G06F 18/22 |
| 2023/0153352 A1* | 5/2023 | Mondal | G06V 10/764 |
| | | | 707/736 |
| 2023/0214423 A1 | 7/2023 | Wang et al. | |
| 2023/0291959 A1* | 9/2023 | Chen | H04N 21/4882 |
| 2025/0106486 A1* | 3/2025 | Li | H04N 21/44016 |

FOREIGN PATENT DOCUMENTS

| | | |
|---|---|---|
| JP | 2020173776 A | 10/2020 |
| JP | 2020174339 A | 10/2020 |
| JP | 2021099803 A | 7/2021 |
| JP | 2022094684 A | 6/2022 |

OTHER PUBLICATIONS

Extended European Search Report of European patent application No. 24197667.9 dated Feb. 19, 2025, 8 pages.

* cited by examiner

VIDEO GENERATION METHOD, DEVICE AND STORAGE MEDIUM

CROSS-REFERENCE TO RELATED APPLICATION

This application claims the priority and benefit of Chinese Patent Application No. 202311387153.1, filed on Oct. 24, 2023, entitled "VIDEO GENERATION AND ARRANGEMENT MODEL ACQUISITION METHOD, APPARATUS, DEVICE AND STORAGE MEDIUM". The disclosure of the above application is incorporated herein by reference in its entirety.

TECHNICAL FIELD

The present disclosure relates to the field of artificial intelligence technology, particularly to a video generation method, device and storage medium in the fields of deep learning, large models, natural language processing and computer vision.

BACKGROUND

As a type of information medium, video is becoming increasingly popular due to its rich media format and ability to provide immersive experiences. Correspondingly, the question of how to generate videos arises.

SUMMARY

The present disclosure provides a video generation method, device and storage medium.

A video generation method, including: obtaining text information to be processed, and segmenting the text information to be processed into sentences to obtain target sentences; selecting video shots matching the target sentences respectively from video shots in a material library as candidate materials corresponding to the target sentences respectively; for the target sentences, performing the following processing respectively: determining a screening method corresponding to a target sentence according to a position of the target sentence in the text information to be processed, selecting a target material for generating a required target video from the candidate materials corresponding to the target sentence according to the screening method; and generating the target video based on the target materials corresponding to the target sentences respectively.

An electronic device, including: at least one processor; and a memory communicatively connected to the at least one processor, the memory stores instructions executable by the at least one processor, which, when executed by the at least one processor, cause the at least one processor to execute the method as described above.

A non-transitory computer-readable storage medium including computer instructions, which, when executed by a computer, cause the computer to carry out the method as described above.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION OF EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications may be made with respect to the embodiments described herein without departing from the scope and spirit of the present disclosure. Similarly, for clarity and conciseness, the descriptions of the known functions and structures are omitted in the descriptions below.

In addition, it should be understood that the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Figure 1:
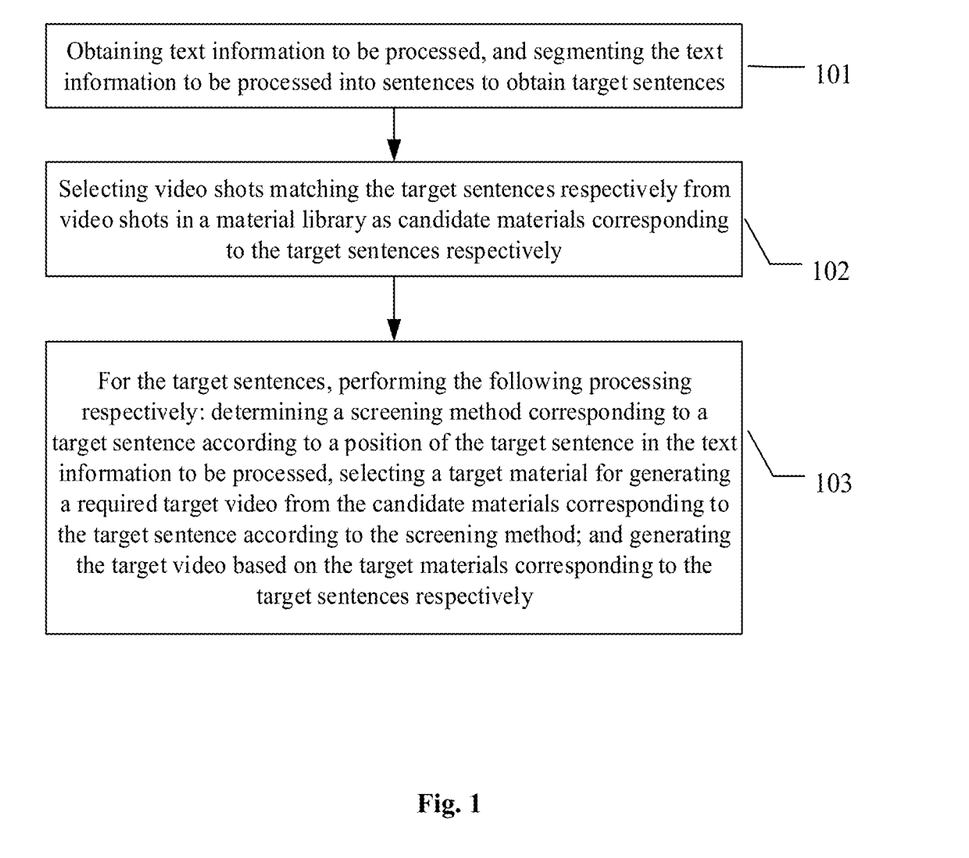
FIG. 1 is a flow chart of a video generation method according to an embodiment of the present disclosure.

FIG. 1 is a flow chart of a video generation method according to an embodiment of the present disclosure. As shown in FIG. 1, the method includes the following specific implementations.

In step 101, text information to be processed is obtained, and the text information to be processed is segmented into sentences to obtain target sentences.

In step 102, video shots matching the target sentences are selected respectively from video shots in a material library as candidate materials corresponding to the target sentences respectively.

In step 103, for the target sentences, the following processing is performed respectively: determining a screening method corresponding to a target sentence according to a position of the target sentence in the text information to be processed, selecting a target material for generating a required target video from the candidate materials corresponding to the target sentence according to the screening method; and generating the target video based on the target materials corresponding to the target sentences, respectively.

Traditional video generation methods mainly include: 1) Manual editing and creation method, i.e., manually indexing video clips based on scripts, and manually synthesizing and rendering based on the indexing results, but this method involves a large amount of manual operation, thus requiring high labor and time costs, and is inefficient; 2) Real person shooting method based on scripts, but this method has higher costs, lower efficiency, and is not easily replicable.

With the solution described in the above method embodiment, based on the text information to be processed, through a series of operations such as text segmentation, candidate material selection, target material selection, and video generation, the required target video may be automatically generated, thereby saving labor and time costs, and improving processing efficiency. Moreover, it may be applied to any text information to be processed, with wide applicability.

Optionally, an article selected by a user may be taken as an article to be processed, and text information extraction may be performed on the article to be processed, and the extracted text information is taken as the text information to be processed.

For example, the article selected by the user may refer to an article published or reposted by the user on a certain self-media platform, which may include various information such as text and images. Correspondingly, text information extraction may be performed on the article to obtain the required text information to be processed. That is, based on the article selected by the user, the required text information to be processed may be obtained conveniently and quickly.

In addition, optionally, before performing text information extraction on the article to be processed, a pre-trained article classification model may be used to classify the article to be processed. In response to determining that the article to be processed does not belong to a predetermined article type based on a classification result, text information extraction is performed on the article to be processed. And/or, after performing text information extraction on the article to be processed, invalid information filtering may be performed on the extracted text information, and the filtered text information is taken as the text information to be processed. The article classification model may be pre-trained using constructed training samples.

In other words, for an article to be processed, the article type thereof may be first determined. If the article type belongs to a predetermined article type, the processing may be directly ended. Otherwise, subsequent processing may be continued, i.e., performing text information extraction on the article to be processed, etc. The specific type(s) of the predetermined article type are not limited, usually referring to article types that are not suitable for generating corresponding videos, such as pure photo explanation types, etc. Through this processing, the quality of subsequently generated videos may be improved.

For the text information extracted from the article to be processed, invalid information filtering may also be performed, and filtered text information may then be used as the text information to be processed. Invalid information usually refers to information that is not helpful for the subsequently generated video content. Filtering out such information in advance may reduce the workload of subsequent processing, thereby saving resource consumption and further improving processing efficiency. For example, if the article to be processed is an article reposted by the user, information such as "Article source . . . " may be filtered out. The specific types of invalid information may be determined according to actual needs.

The text information to be processed may be segmented into sentences, and for ease of distinction, the sentences obtained from the segmentation may be called target sentences. For example, the text information to be processed may be segmented according to punctuation marks that indicate the end of a sentence, and correspondingly, each target sentence is a complete sentence.

Afterwards, video shots matching the target sentences respectively may be selected respectively from the video shots in the material library as candidate materials corresponding to the target sentences respectively.

The material library may be created previously, which may include multiple video shots, i.e., multiple short videos, with each short video corresponding to a complete shot. For example, for various long videos collected, Shot Boundary Detection (SBD) algorithm may be used to divide them respectively, thus obtaining multiple video shots of the same or different durations. Low-quality filtering may be performed on the divided video shots, and the filtered video shots may then be added to the material library.

Optionally, for each target sentence, the following processing may be performed respectively: obtaining a text encoding of the target sentence, obtaining similarities between respective video encodings of the video shots in the material library and the text encoding respectively, and taking Q video shots with the highest similarities as the candidate materials corresponding to the target sentence, where Q is a positive integer greater than one.

The specific value of Q may be determined according to actual needs, for example, it may be 20.

Assuming the material library contains 1000 (number for illustration only) video shots, then the video encoding of each video shot may be obtained and stored in advance. For any target sentence such as target sentence a, the text encoding of target sentence a may be obtained, and the similarities between the text encoding of target sentence a and respective video encodings of 1000 video shots may be obtained respectively. Then, the 20 similarities with the highest values may be selected from the 1000 obtained similarities, and the video shots corresponding to these 20 similarities may be taken as candidate materials corresponding to target sentence a.

Through the above processing, candidate materials corresponding to each target sentence may be retrieved, thus laying a good foundation for subsequent processing.

Optionally, for any target sentence, a pre-trained Contrastive Language-Image Pre-Training (CLIP) model may be used to determine the text encoding of the target sentence. That is, the target sentence may be used as input to the CLIP model to obtain the output text encoding. Additionally, the CLIP model may also be used to determine the video encoding of each video shot in the material library. The CLIP model is a mature existing model, correspondingly ensuring the accuracy of the obtained encoding results.

After obtaining respective candidate materials corresponding to the target sentences respectively, target materials for generating the target video may be further selected from the candidate materials.

Optionally, the target sentences may be sorted according to the order of their positions in the text information to be processed from first to last. Then, the target sentences may be traversed sequentially according to the sorting order from first to last. For each traversed target sentence, the following processing may be performed: taking the traversed target sentence as a target sentence to be processed, in response to the target sentence to be processed being a first target sentence after sorting, directly selecting the target materials corresponding to the target sentence to be processed from candidate materials corresponding to the target sentence to be processed; in response to the target sentence to be processed being not the target sentence after sorting, selecting the target materials corresponding to the target sentence to be processed from the candidate materials corresponding to the target sentence to be processed in consideration of one or more target sentences before the target sentence to be processed and respective target materials corresponding to the one or more target sentences before the target sentence to be processed.

That is, based on whether the target sentence to be processed is the first target sentence after sorting, different processing methods are adopted to determine the corresponding target materials, making the processing more targeted and thus improving the accuracy of the determined target materials.

Optionally, if the target sentence to be processed is the first target sentence after sorting, then the candidate materials corresponding to the target sentence to be processed may be sorted according to the order of similarities between respective video encodings of the candidate materials and the text encoding of the target sentence to be processed from high to low. The target materials corresponding to the target sentence to be processed may be determined based on the sorting result.

Optionally, if the target sentence to be processed is not the first target sentence after sorting, then for each candidate material corresponding to the target sentence to be processed, the following processing may be performed: based on a first sequence and a second sequence latest obtained, generating a third sequence and a fourth sequence corresponding to the candidate material, the first sequence includes: respective video encodings of target materials corresponding to the one or more target sentences before the target sentence to be processed; the second sequence includes: respective text encodings of the one or more target sentences before the target sentence to be processed; the third sequence is obtained by adding the video encoding of the candidate material to the end of the first sequence; the fourth sequence is obtained by adding the text encoding of the target sentence to be processed to the end of the second sequence; determining a comprehensive score of the candidate material based on the third sequence and the fourth sequence; sorting the candidate materials according to the order of comprehensive scores from high to low, determine the target materials corresponding to the target sentence to be processed based on a sorting result, and adding the video encoding of the target materials corresponding to the target sentence to be processed to the end of the first sequence to obtain an updated first sequence, and adding the text encoding of the target sentence to be processed to the end of the second sequence to obtain an updated second sequence.

For example, assuming there are 10 target sentences, numbered as target sentence 1 to target sentence 10 according to the sorting order. First, a target material corresponding to target sentence 1 may be determined, such as sorting the 20 candidate materials corresponding to target sentence 1 according to the order of similarities between respective video encodings of the candidate materials and the text encoding of target sentence 1 from high to low, and determining the target material corresponding to target sentence 1 based on the sorting result. Then, respective target materials corresponding to target sentences 2 to 10 may be determined in sequence. Taking target sentence 5 as an example, for each of its 20 corresponding candidate materials, the following processing may be performed: taking candidate material 1 as an example, add the video encoding of candidate material 1 to the end of the first sequence to obtain the third sequence corresponding to candidate material 1, and add the text encoding of target sentence 5 to the end of the second sequence to obtain the fourth sequence corresponding to candidate material 1. The first sequence includes the video encodings of target materials corresponding to target sentences 1, 2, 3, and 4 respectively. The second sequence includes the text encodings of target sentences 1, 2, 3, and 4. Then, the comprehensive score of candidate material 1 may be determined based on the third sequence and the fourth sequence. Similarly, the comprehensive scores of candidate materials 2 to 20 may be obtained respectively. Then, the 20 candidate materials corresponding to target sentence 5 may be sorted according to the order of comprehensive scores from high to low, and the target materials corresponding to target sentence 5 may be determined based on the sorting result. Afterwards, the first sequence and the second sequence may be updated, that is, add the video encoding of the target materials corresponding to target sentence 5 to the end of the first sequence, and add the text encoding of target sentence 5 to the end of the second sequence.

It can be seen that since there are no other target sentences before the first target sentence after sorting, target materials may be directly selected for the first target sentence from the corresponding candidate materials, thereby improving processing efficiency. For the target sentences other than the first after sorting, target materials may be selected from the corresponding candidate materials in consideration of one or more target sentences before the target sentence and respective target materials corresponding to the one or more target sentences, thereby improving the accuracy of the determined target materials.

Optionally, for any candidate material corresponding to a target sentence (target sentence to be processed) which is not the first one after sorting, the similarity between the video encoding of the candidate material and the text encoding of the target sentence to be processed may be obtained. Additionally, the sequence correlation score between the third sequence and the fourth sequence corresponding to the candidate material, and the sequence consistency score of the third sequence may be obtained. Then, the comprehensive score of the candidate material may be determined by combining the similarity, the sequence correlation score, and the sequence consistency score.

For example, the similarity, the sequence correlation score, and the sequence consistency score may be multiplied by their corresponding weights respectively, and the three products may be summed to obtain the comprehensive score of the candidate material. The specific values of the weights may be determined according to actual needs.

Optionally, based on the third sequence and the fourth sequence, a pre-trained arrangement model may be used to determine the sequence correlation score and the sequence consistency score. For instance, the third sequence and the fourth sequence may be used as inputs to the arrangement model to obtain the output sequence correlation score and sequence consistency score.

That is, with the help of the pre-trained arrangement model, the required score information may be obtained efficiently and accurately.

As mentioned earlier, for the target sentence to be processed, after sorting its corresponding candidate materials, the target material corresponding to the target sentence to be processed may be determined based on the sorting result. Optionally, top L candidate materials after sorting may be taken as target materials corresponding to the target sentence to be processed, where L is a positive integer. The value of L may be a fixed value, or it may be determined according to the principle that the total duration of selected target materials matches the text-to-speech (TTS) audio duration of the target sentence to be processed.

In other words, the value of L may be a fixed value, with the specific value determined according to actual needs, such as 1. Or, the value of L may also be dynamically determined, which is very flexible and convenient.

For the latter approach, the TTS audio duration of the target sentence to be processed may be determined according to existing methods. The TTS audio duration of the target sentence to be processed is the audio duration of the target sentence to be processed when configuring TTS audio for the subsequently generated target video. Then, the value of L may be determined according to a principle that the total duration of selected target materials equals the TTS audio duration of the target sentence to be processed. For example, if only the first-ranked candidate material after sorting is selected as the target material, and the total duration equals the TTS audio duration of the target sentence to be processed, then the value of L is 1. If the first and second-ranked candidate materials after sorting are selected as target materials, and the total duration equals the TTS audio duration of the target sentence to be processed, then the value of L is 2, and so on. In special cases, for example, if the value of L is 2 and the total duration is less than the TTS audio duration of the target sentence to be processed, but if the value of L is 3 and the total duration is greater than the TTS audio duration of the target sentence to be processed, then the third-ranked candidate material after sorting may be trimmed (to shorten its duration) to make the total duration equal to the TTS audio duration of the target sentence to be processed when L is 3.

After obtaining respective target materials corresponding to the target sentences respectively, the target video may be generated based on these target materials. Optionally, the target video may be rendered using Fast Forward Moving Picture Experts Group (FFMPEG) technology based on the target materials.

That is, video synthesis may be performed on the target materials according to the order of the playback times thereof from first to last. Moreover, the following operations may be executed: adding subtitles, configuring TTS audio, adding danmaku (bullet screen comments), adding opening and ending clips, etc., based on each target sentence for the synthesized video, to enhance the video presentation effect.

Figure 2:
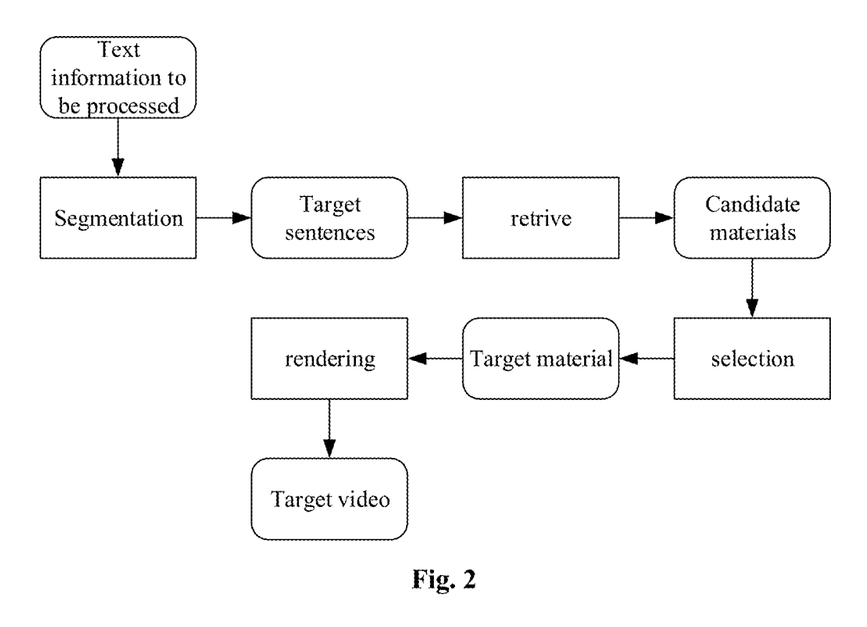
FIG. 2 is a schematic diagram of the overall implementation process of the video generation method according to the present disclosure.

In consideration of the above description, FIG. 2 shows the overall implementation process diagram of the video generation method of this disclosure. The specific implementation may refer to the previous related descriptions and will not be repeated here. In this process, a pre-trained arrangement model may be used to select target materials from candidate materials. The following will further explain how to obtain the arrangement model.

Figure 3:
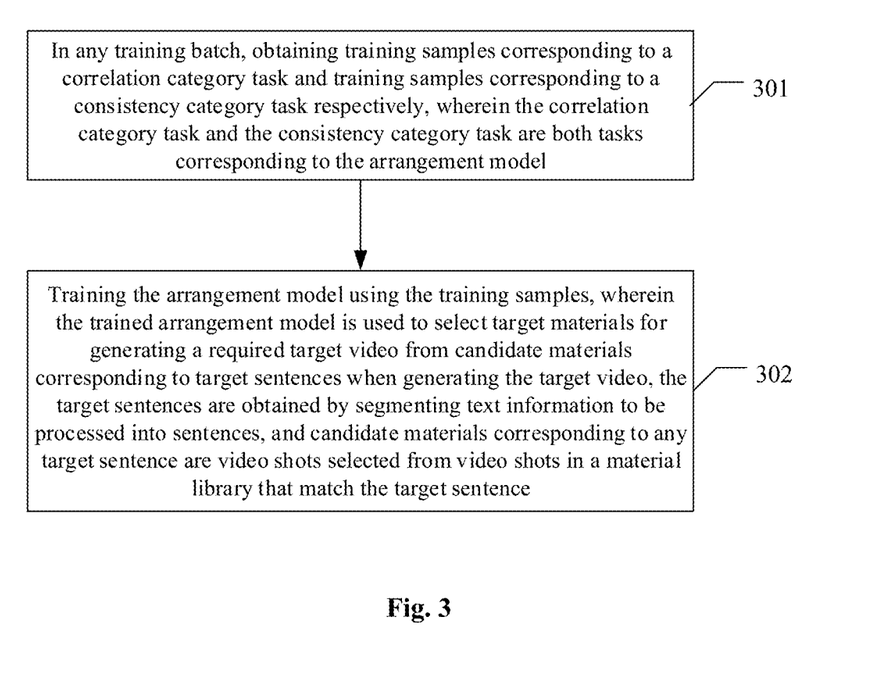
FIG. 3 is a flow chart of an arrangement model acquisition method according to an embodiment of the present disclosure.

FIG. 3 is a flow chart of the arrangement model acquisition method according to an embodiment of this disclosure. As shown in FIG. 3, the method includes the following specific implementation methods:

In step 301, in any training batch, training samples corresponding to a correlation category task and training samples corresponding to a consistency category task are obtained respectively. Both the correlation category task and the consistency category task are tasks corresponding to the arrangement model.

In step 302, the arrangement model is trained using the training samples. The trained arrangement model is used to select target materials for generating a required target video from candidate materials corresponding to target sentences when generating the target video. The target sentences are obtained by segmenting the text information to be processed into sentences, and the candidate materials corresponding to any target sentence are video shots selected from video shots in the material library that match the target sentence.

With the solution described in this method embodiment, based on the text information to be processed, through a series of operations such as text segmentation, candidate material selection, target material selection using the arrangement model, and video generation, the required target video may be automatically generated, thereby saving labor and time costs, and improving processing efficiency.

Optionally, P text-video pairs corresponding to the batch may be obtained, where P is a positive integer greater than one, with the specific value determined according to actual needs. Each text-video pair may include: a text collection composed of at least two sentences and a video collection composed of at least two video shots. The at least two sentences come from the same text information and are arranged in order of positions in the text information from first to last. Each sentence in the text collection corresponds to at least one video shot in the video collection, and the video shots in the video collection are arranged in order of playback time from first to last. Furthermore, training samples corresponding to the correlation category task and training samples corresponding to the consistency category task may be constructed based on the obtained text-video pairs.

For example, an article and its corresponding video, i.e., a video matching the article, may be obtained through some method. Furthermore, by performing text information extraction and sentence segmentation on the article, n sentences may be obtained and used to form a text collection. Additionally, the video corresponding to the article may be divided using the SBD algorithm to obtain m video shots, which may be used to form a video collection. Then, a text-video pair may be composed using the text collection and the video collection, where n and m are both positive integers greater than one.

In practical applications, the arrangement model may be trained through multiple batches. In each batch, training samples corresponding to the correlation category task and training samples corresponding to the consistency category task may be constructed based on the P text-video pairs obtained. That is, in the training process of the arrangement model, there are mainly two tasks for constraint: one is the correlation category task, and the other is the consistency category task. Correlation refers to whether the text and video are related, while consistency refers to whether the style of a set of continuous video shots is consistent.

Optionally, the method of constructing training samples corresponding to the correlation category task may include: taking the obtained text-video pairs as positive samples; for any obtained text-video pair, randomly selecting k1 video shots from other text-video pairs, where k1 is a positive integer and less than the number of video shots in the video collection of this text-video pair; inserting the selected k1 video shots into the video collection of this text-video pair to obtain a modified video collection, composing a negative sample using the text collection of this text-video pair and the modified video collection; or, for any text-video pair, randomly selecting k2 sentences from other text-video pairs, where k2 is a positive integer and less than the number of sentences in the text collection of this text-video pair, inserting the selected k2 sentences into the text collection of the text-video pair to obtain a modified text collection, composing a negative sample using the modified text collection and the video collection of this text-video pair; taking the positive samples and negative samples as training samples corresponding to the correlation category task.

The specific values of k1 and k2 may be determined according to actual needs. Additionally, the specific number of generated negative samples may also be determined based on actual needs.

For example, for any text-video pair a, k1 video shots may be randomly selected from other text-video pairs in the batch. These k1 video shots may come from the same text-video pair or from multiple different text-video pairs. These k1 video shots may be randomly inserted into the video collection of text-video pair a to obtain a modified video collection. Then, a negative sample may be composed using the text collection of text-video pair a and the modified video collection. Alternatively, instead of modifying the video collection, the text collection may be modified. That is, k2 sentences may be randomly selected from other text-video pairs in the batch. These k2 sentences may come from the same text-video pair or from multiple different text-video pairs. These k2 sentences may be randomly inserted into the text collection of text-video pair a to obtain a modified text collection. Then, a negative sample may be composed using the modified text collection and the video collection of text-video pair a.

Optionally, the method of constructing training samples corresponding to the consistency category task may include: for each obtained text-video pair, randomly selecting one of the following three predetermined methods to process its video collection: keeping the video collection unchanged; randomly selecting k3 video shots from other text-video pairs, where k3 is a positive integer and less than the number of video shots in the video collection, replacing k3 video shots in the video collection with the selected k3 video shots; or randomly adjusting the arrangement order of some video shots in the video collection; taking the text-video pairs processed according to the predetermined method as training samples corresponding to the consistency category task. The specific value of k3 may be determined according to actual needs.

Taking text-video pair b as an example, for its video collection, method one, two, or three may be randomly selected for processing. In method one, the video collection remains unchanged. In method two, k3 video shots are randomly selected from other text-video pairs in the batch. These k3 video shots may come from the same text-video pair or from multiple different text-video pairs. Then, these k3 video shots are used to randomly replace k3 video shots in the original video collection. In method three, the arrangement order of some video shots in the video collection is randomly adjusted, i.e., the video collection undergoes random position updates.

It can be seen that, through the above processing, training samples corresponding to different tasks may be quickly and conveniently constructed based on the obtained text-video pairs. These training samples may then be used to train the arrangement model, thereby improving the model's training effect.

Figure 4:
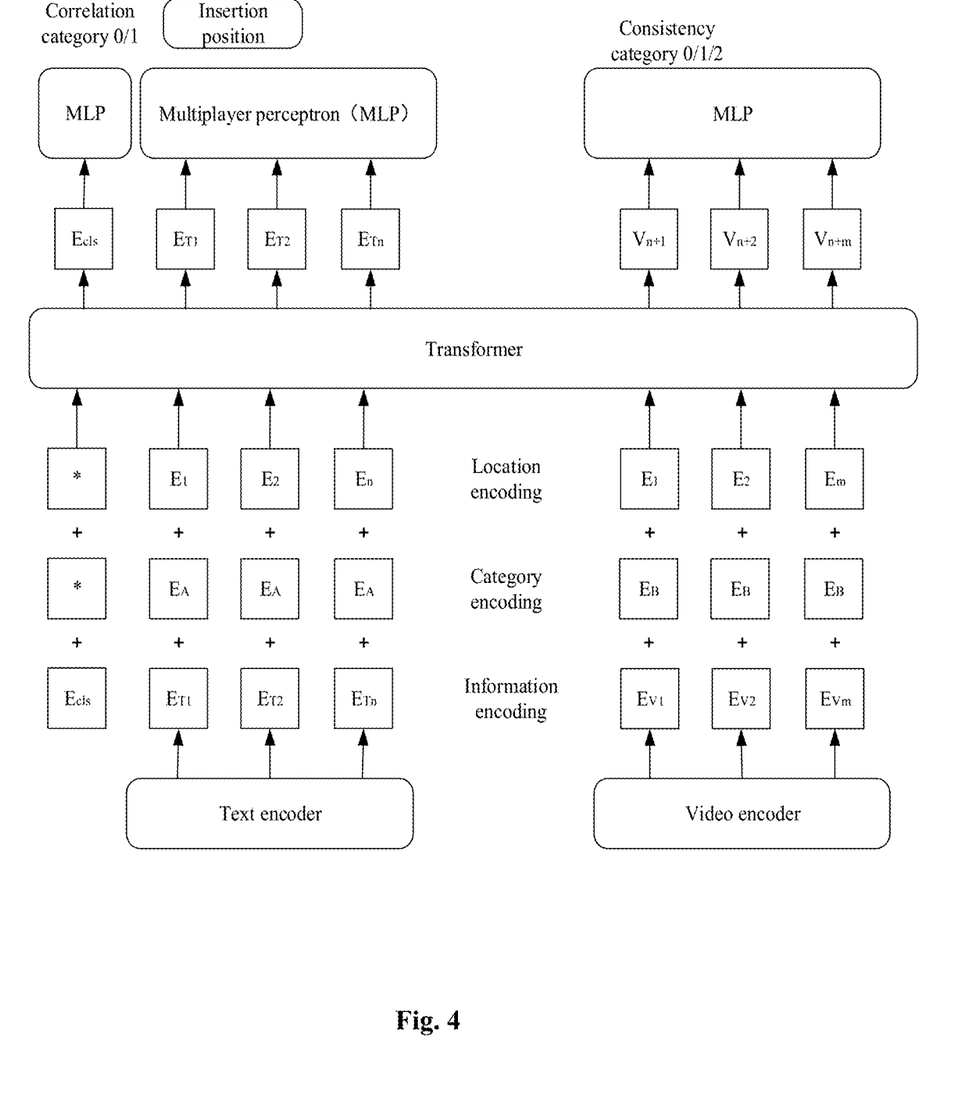
FIG. 4 is a structural schematic diagram of an arrangement model according to the present disclosure.

As a possible implementation, FIG. 4 shows a structural diagram of the arrangement model described in this disclosure. As shown in FIG. 4, the text encoding represents the text encoding of sentences in the training samples, and the video encoding represents the video encoding of video shots in the training samples. Both text encoding and video encoding may be obtained through the CLIP model. Based on the text encoding and video encoding, information encoding, category encoding, position encoding, Transformer, and Multilayer Perceptron (MLP) processing may be performed sequentially. In the figure, the number of sentences is n and the number of video shots is m. Additionally, the correlation category task outputs binary classification results, such as 0 or 1, used to indicate whether the text and video (sentence and video shot) are related, and a first loss (loss1) may be calculated accordingly. It also outputs an insertion position of a sentence or video shot, and a second loss (loss2) may be calculated accordingly. The consistency category task outputs a method prediction result, such as 0, 1, or 2, used to indicate which of the above three methods was used to process the video collection, and a third loss (loss3) may be calculated accordingly. Then, the model may be updated according to loss1, loss2, and loss3. This process may be repeated continuously until the model converges, and the trained model may be applied in practice, such as for selecting target materials from candidate materials corresponding to each target sentence when generating a required target video.

It should be noted that for simplicity of description, all the above-mentioned embodiments of the method are described as combinations of a series of acts, but those skilled in the art should understand that the present disclosure is not limited by the described order of acts, as some steps may be performed in other orders or simultaneously according to the present disclosure. Further, those skilled in the art should also understand that the embodiments described in this specification are preferred embodiments and that acts and modules referred to are not necessary for the present disclosure. In addition, for parts that are not described in detail in a certain embodiment, reference may be made to the related descriptions of other embodiments.

The above is a description of an embodiment of the method, and an embodiment of an apparatus according to the present disclosure will be further described below.

Figure 5:
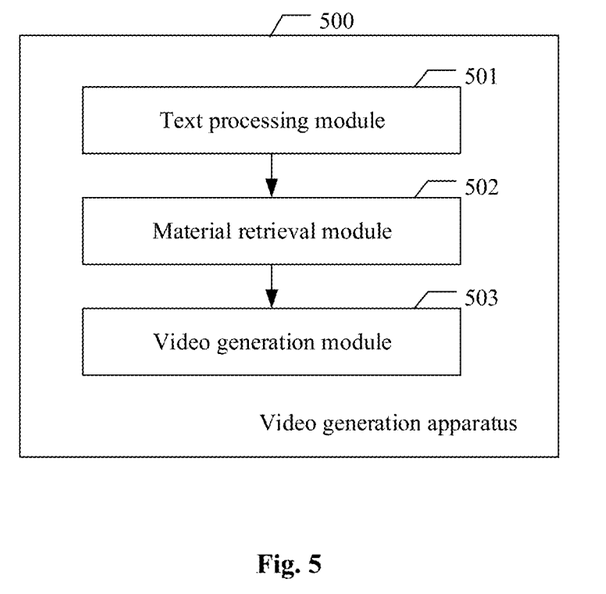
FIG. 5 is a structural schematic diagram of the composition of an embodiment 500 of the video generation apparatus according to the present disclosure.

FIG. 5 shows the structural diagram of a video generation apparatus embodiment 500 described in this disclosure. As shown in FIG. 5, the apparatus includes: a text processing module 501, a material retrieval module 502, and a video generation module 503.

The text processing module 501 is used to obtain text information to be processed, and segment the text information to be processed into sentences to obtain target sentences.

The material retrieval module 502 is used to select video shots matching the target sentences respectively from video shots in a material library as candidate materials corresponding to the target sentences respectively.

The video generation module 503 is used to perform the following processing for the target sentences respectively: determining a screening method corresponding to a target sentence according to a position of the target sentence in the text information to be processed, selecting a target material for generating a required target video from the candidate materials corresponding to the target sentence according to the screening method; and generating the target video based on the target materials corresponding to the target sentences respectively.

With the solution described in this apparatus embodiment, based on the text information to be processed, through a series of operations such as text segmentation, candidate material selection, target material selection, and video generation, the required target video may be automatically generated, thereby saving labor and time costs, and improving processing efficiency. Moreover, it may be applied to any text information to be processed, with wide applicability.

Optionally, the text processing module 501 may take an article selected by a user as an article to be processed, and perform text information extraction on the article to be processed, and then take the extracted text information as the text information to be processed.

In addition, optionally, before performing text information extraction on the article to be processed, the text processing module 501 may use a pre-trained article classification model to classify the article to be processed. In response to determining that the article to be processed does not belong to a predetermined article type based on a classification result, it may perform text information extraction on the article to be processed. And/or, after performing text information extraction on the article to be processed, it may perform invalid information filtering on the extracted text information, and take filtered text information as the text information to be processed. The article classification model may be pre-trained using constructed training samples.

Regarding the text information to be processed, the text processing module 501 may segment it into sentences, and treat the segmented sentences as target sentences. For example, the text information to be processed may be segmented according to punctuation marks that indicate the end of a sentence. Correspondingly, each target sentence is a complete sentence.

Then, the material retrieval module 502 may select video shots matching the target sentences respectively from the video shots in the material library as candidate materials corresponding to the target sentences respectively. The material library may be pre-built, which may include multiple video shots, i.e., multiple short videos, with each short video corresponding to a complete shot.

Optionally, for each target sentence, the material retrieval module 502 may perform the following processing: obtain the text encoding of the target sentence, obtain the similarities between the video encodings of video shots in the material library and the text encoding respectively, and take the Q video shots with the highest similarities as candidate materials corresponding to the target sentence, where Q is a positive integer greater than one.

Optionally, for any target sentence, the material retrieval module 502 may use a pre-trained CLIP model to determine the text encoding of the target sentence. Additionally, it may use the CLIP model to determine the video encoding of the video shots in the material library respectively.

After obtaining candidate materials corresponding to the target sentences respectively, the video generation module 503 may further select target materials for generating the target video from the candidate materials.

Optionally, the video generation module 503 may sort the target sentences according to the order of their appearance positions in the text information to be processed from first to last. Then, it may traverse the target sentences sequentially according to the sorting order from first to last. For each traversed target sentence, it may perform the following processing respectively: take the traversed target sentence as a target sentence to be processed, in response to the target sentence to be processed being a first target sentence after sorting, directly select target materials corresponding to the target sentence to be processed from candidate materials corresponding to the target sentence to be processed; in response to the target sentence to be processed being not the first target sentence after sorting, select the target materials corresponding to the target sentence to be processed from candidate materials corresponding to the target sentence to be processed in consideration of one or more target sentences before the target sentence to be processed and respective target materials corresponding to the one or more target sentences before the target sentence to be processed.

Optionally, if the target sentence to be processed is the first target sentence after sorting, the video generation module 503 may sort the candidate materials corresponding to the target sentence to be processed according to the order of similarities between the respective video encodings of the candidate materials and the text encoding of the target sentence to be processed from high to low. It may then determine the target materials corresponding to the target sentence to be processed based on the sorting result.

Optionally, if the target sentence to be processed is not the first target sentence after sorting, the video generation module 503 may perform the following processing for each candidate material corresponding to the target sentence to be processed: based on a first sequence and a second sequence latest obtained, generate a third sequence and a fourth sequence corresponding to the candidate material. The first sequence includes respective video encodings of target materials corresponding to the one or more target sentences before the target sentence to be processed. The second sequence includes respective text encodings of the one or more target sentences before the target sentence to be processed. The third sequence is obtained by adding the video encoding of the candidate material to the end of the first sequence. The fourth sequence is obtained by adding the text encoding of the target sentence to be processed to the end of the second sequence. Determine a comprehensive score of the candidate material based on the third sequence and the fourth sequence. Sort the candidate materials according to the order of comprehensive scores from high to low, determine target materials corresponding to the target sentence to be processed based on the sorting result, and add the video encoding of the target materials corresponding to the target sentence to be processed to the end of the first sequence to obtain an updated first sequence, and add the text encoding of the target sentence to be processed to the end of the second sequence to obtain an updated second sequence.

Optionally, for any candidate material corresponding to any target sentence (target sentence to be processed) other than the first one after sorting, the video generation module 503 may obtain the similarity between the video encoding of the candidate material and the text encoding of the target sentence to be processed, and obtain a sequence correlation score between the third sequence and the fourth sequence corresponding to the candidate material, and a sequence consistency score of the third sequence. Then, it may determine the comprehensive score of the candidate material by combining the similarity, the sequence correlation score, and the sequence consistency score.

For example, the similarity, the sequence correlation score, and the sequence consistency score may be multiplied by their corresponding weights respectively, and the three products may be summed to obtain the comprehensive score of the candidate material.

Optionally, the video generation module 503 may determine the sequence correlation score and the sequence consistency score using a pre-trained arrangement model based on the third sequence and the fourth sequence.

As mentioned above, for the target sentence to be processed, after sorting its corresponding candidate materials, the target material corresponding to the target sentence to be processed may be determined based on the sorting result. Optionally, the video generation module 503 may take top L candidate materials after sorting as target materials corresponding to the target sentence to be processed, where L is a positive integer. The value of L may be a fixed value, or it may be determined according to the principle that the total duration of selected target materials matches the text-to-speech (TTS) audio duration of the target sentence to be processed.

After obtaining the target materials corresponding to each target sentence respectively, the video generation module 503 may generate the target video based on the target materials. Optionally, the video generation module 503 may render the target video using Fast Forward Moving Picture Experts Group (FFMPEG) technology based on the target materials.

Figure 6:
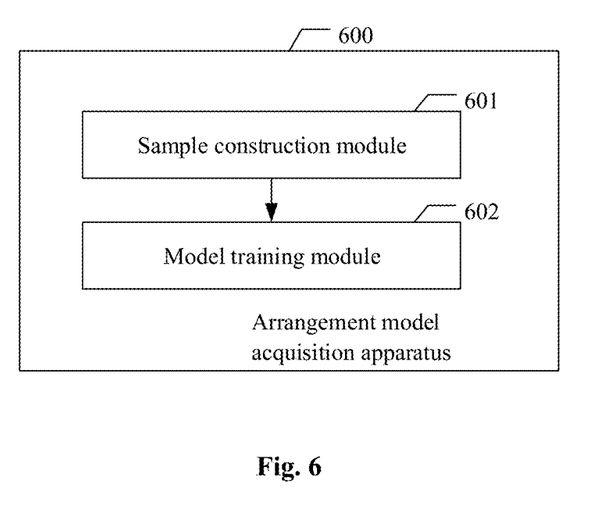
FIG. 6 is a structural schematic diagram of the composition of an embodiment 600 of the arrangement model acquisition apparatus according to the present disclosure.

FIG. 6 shows the structural diagram of an arrangement model acquisition apparatus embodiment 600 described in this disclosure. As shown in FIG. 6, the apparatus includes: a sample construction module 601 and a model training module 602.

The sample construction module 601 is used to obtain training samples corresponding to the correlation category task and training samples corresponding to the consistency category task respectively in any training batch. Both the correlation category task and the consistency category task are tasks corresponding to the arrangement model.

The model training module 602 is used to train the arrangement model using the training samples. The trained arrangement model is used to select target materials for generating a required target video from candidate materials corresponding to the target sentences when generating the target video. The target sentences are obtained by segmenting the text information to be processed into sentences, and the candidate materials corresponding to any target sentence are video shots selected from video shots in a material library that match the target sentence.

With the solution described in this apparatus embodiment, based on the text information to be processed, through a series of operations such as text segmentation, candidate material selection, target material selection using the arrangement model, and video generation, the required target video may be automatically generated, thereby saving labor and time costs, and improving processing efficiency.

Optionally, the sample construction module 601 may obtain P text-video pairs corresponding to the batch, where P is a positive integer greater than one, with the specific value determined according to actual needs. Each text-video pair may include: a text collection composed of at least two sentences and a video collection composed of at least two video shots. The at least two sentences come from the same text information and are arranged in order of positions in the text information from first to last. Each sentence in the text collection corresponds to at least one video shot in the video collection, and the video shots in the video collection are arranged in order of playback time from first to last. Furthermore, the training samples corresponding to the correlation category task and the training samples corresponding to the consistency category task may be constructed based on the obtained text-video pairs.

Optionally, the method by which the sample construction module 601 constructs training samples corresponding to the correlation category task may include: taking the obtained text-video pairs as positive samples; for any obtained text-video pair, randomly selecting k1 video shots from other text-video pairs, where k1 is a positive integer and less than the number of video shots in the video collection of this text-video pair, inserting the selected k1 video shots into the video collection of this text-video pair to obtain a modified video collection, composing a negative sample using the text collection of this text-video pair and the modified video collection, or, for any text-video pair, randomly selecting k2 sentences from other text-video pairs, where k2 is a positive integer and less than the number of sentences in the text collection of this text-video pair, inserting the selected k2 sentences into the text collection of this text-video pair to obtain a modified text collection, composing a negative sample using the modified text collection and the video collection of this text-video pair; taking the positive samples and negative samples as training samples corresponding to the correlation category task.

In addition, optionally, the method by which the sample construction module 601 constructs training samples corresponding to the consistency category task may include: for each obtained text-video pair, randomly selecting one of the following three predetermined methods to process its video collection: keeping the video collection unchanged; randomly selecting k3 video shots from other text-video pairs, where k3 is a positive integer and less than the number of video shots in the video collection, replacing k3 video shots in the video collection with the selected k3 video shots; or randomly adjusting the arrangement order of some video shots in the video collection; taking the text-video pairs processed according to the predetermined method as training samples corresponding to the consistency category task.

The specific working processes of the apparatus embodiments shown in FIGS. 5 and 6 may refer to the relevant descriptions in the aforementioned method embodiments, and will not be repeated here.

In summary, by adopting the scheme described in this disclosure, the required target video may be automatically generated, thereby saving labor and time costs, and improving processing efficiency. Moreover, it may ensure the video effects of the generated target video, effectively promoting the development of the video ecosystem.

The solution described in this disclosure may be applied to the field of artificial intelligence, especially involving areas such as deep learning, large models, natural language processing, and computer vision. Artificial intelligence is a discipline that studies how to make computers simulate certain human thought processes and intelligent behaviors (such as learning, reasoning, thinking, planning, etc.). It involves technologies at both hardware and software levels. AI hardware technologies generally include sensors, specialized AI chips, cloud computing, distributed storage, big data processing, etc. AI software technologies mainly include computer vision technology, speech recognition technology, natural language processing technology, machine learning/deep learning, big data processing technology, knowledge graph technology, and other major directions.

Additionally, the text information and video shots mentioned in the embodiments of this disclosure are not targeted at any specific user and do not reflect personal information of any specific user. In the technical solution of this disclosure, the collection, storage, use, processing, transmission, provision, and disclosure of user personal information are all in compliance with relevant laws and regulations, and do not violate public order and good custom.

According to the embodiment of the present disclosure, there are also provided an electronic device, a readable storage medium and a computer program product.

Figure 7:
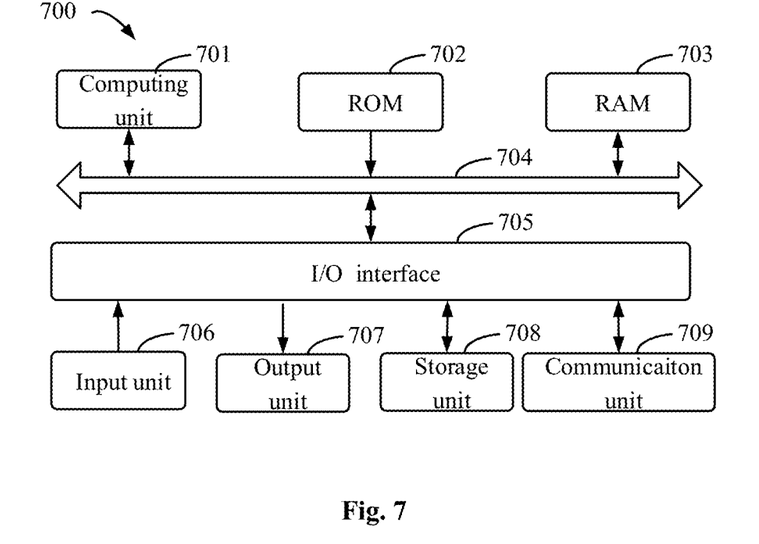
FIG. 7 shows a schematic block diagram of an electronic device 700 configured to implement embodiments of the present disclosure.

FIG. 7 shows a schematic block diagram of an electronic device 700 which may be configured to implement the embodiment of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 7, the device 700 includes a computing unit 701 which may perform various appropriate actions and processing operations according to a computer program stored in a read only memory (ROM) 702 or a computer program loaded from a storage unit 708 into a random access memory (RAM) 703. Various programs and data necessary for the operation of the device 700 may be also stored in the RAM 703. The computing unit 701, the ROM 702, and the RAM 703 are connected with one other through a bus 704. An input/output (I/O) interface 705 is also connected to the bus 704.

The plural components in the device 700 are connected to the I/O interface 705, and include: an input unit 706, such as a keyboard, a mouse, or the like; an output unit 707, such as various types of displays, speakers, or the like; the storage unit 708, such as a magnetic disk, an optical disk, or the like; and a communication unit 709, such as a network card, a modem, a wireless communication transceiver, or the like. The communication unit 709 allows the device 700 to exchange information/data with other devices through a computer network, such as the Internet, and/or various telecommunication networks.

The computing unit 701 may be a variety of general and/or special purpose processing components with processing and computing capabilities. Some examples of the computing unit 701 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 701 performs the methods and processing operations described above, such as the method according to the present disclosure. For example, in some embodiments, the method according to the present disclosure may be implemented as a computer software program tangibly contained in a machine readable medium, such as the storage unit 708. In some embodiments, part or all of the computer program may be loaded and/or installed into the device 700 via the ROM 702 and/or the communication unit 709. When the computer program is loaded into the RAM 703 and executed by the computing unit 701, one or more steps of the method according to the present disclosure may be performed. Alternatively, in other embodiments, the computing unit 701 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGAs), application specific integrated circuits (ASICs), application specific standard products (ASSPs), systems on chips (SOCs), complex programmable logic devices (CPLDs), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine-readable medium may be a tangible medium which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A video generation method, comprising:
    obtaining text information to be processed, and segmenting the text information to be processed into sentences to obtain target sentences;
    selecting video shots matching the target sentences respectively from video shots in a material library as candidate materials corresponding to the target sentences respectively by,
    for any one target sentence, performing the following processing: obtaining a text encoding of the target sentence, obtaining similarities between respective video encodings of the video shots in the material library and the text encoding respectively, taking Q video shots with the highest similarities as the candidate materials corresponding to the target sentence, where Q is a positive integer greater than one;
    for the target sentences, performing the following processing respectively:
    determining a screening method corresponding to a target sentence according to a position of the target sentence in the text information to be processed, selecting a target material for generating a required target video from the candidate materials corresponding to the target sentence according to the screening method by,
    sorting the target sentences according to an order of their positions in the text information to be processed from first to last;
    traversing the target sentences sequentially according to the sorting order from first to last, and for each traversed target sentence, performing the following processing:
    taking the traversed target sentence as a target sentence to be processed, in response to the target sentence to be processed being a first target sentence after sorting, directly selecting the target material corresponding to the target sentence to be processed from the candidate materials corresponding to the target sentence to be processed;
    in response to the target sentence to be processed being not the first target sentence after sorting, selecting the target material corresponding to the target sentence to be processed from the candidate materials corresponding to the target sentence to be processed in consideration of one or more target sentences before the target sentence to be processed and respective target materials corresponding to the one or more target sentences before the target sentence to be processed by,
    for each candidate material corresponding to the target sentence to be processed, performing the following processing: based on a first sequence and a second sequence latest obtained, generating a third sequence and a fourth sequence corresponding to the candidate material, wherein the first sequence comprises: respective video encodings of target materials corresponding to the one or more target sentences before the target sentence to be processed, the second sequence comprises: respective text encodings of the one or more target sentences before the target sentence to be processed, the third sequence is obtained by adding the video encoding of the candidate material to the end of the first sequence, and the fourth sequence is obtained by adding the text encoding of the target sentence to be processed to the end of the second sequence, and determining a comprehensive score of the candidate material based on the third sequence and the fourth sequence;
    sorting the candidate materials according to the order of comprehensive scores from high to low, determining the target material corresponding to the target sentence to be processed based on a sorting result, and adding the video encoding of the target material corresponding to the target sentence to be processed to the end of the first sequence to obtain an updated first sequence, and adding the text encoding of the target sentence to be processed to the end of the second sequence to obtain an updated second sequence; and
    generating the target video based on the target materials corresponding to the target sentences respectively.

2. The method according to claim 1, wherein obtaining the text information to be processed comprises:
    taking an article selected by a user as an article to be processed, performing text information extraction on the article to be processed, and taking extracted text information as the text information to be processed.

3. The method according to claim 2, further comprising one or both of the following:
    before performing text information extraction on the article to be processed, using a pre-trained article classification model to classify the article to be processed, and in response to determining that the article to be processed does not belong to a predetermined article type based on a classification result, performing text information extraction on the article to be processed; and
    after performing text information extraction on the article to be processed, performing invalid information filtering on the extracted text information, and taking filtered text information as the text information to be processed.

4. The method according to claim 1, wherein obtaining the text encoding of the target sentence comprises: using a pre-trained cross-modal contrastive learning model to determine the text encoding of the target sentence;
    wherein the method further comprises: using the cross-modal contrastive learning model to determine the respective video encodings of the video shots in the material library respectively.

5. The method according to claim 1, wherein in response to the target sentence to be processed being the first target sentence after sorting, directly selecting the target materials corresponding to the target sentence to be processed from the candidate materials corresponding to the target sentence to be processed comprises:

sorting the candidate materials corresponding to the target sentence to be processed according to an order of similarities between the respective video encodings of the candidate materials and the text encoding of the target sentence to be processed from high to low, determining the target material corresponding to the target sentence to be processed based on the sorting result.

6. The method according to claim 1, wherein determining the comprehensive score of the candidate material based on the third sequence and the fourth sequence comprises:

obtaining a similarity between the video encoding of the candidate material and the text encoding of the target sentence to be processed, and obtaining a sequence correlation score between the third sequence and the fourth sequence and a sequence consistency score of the third sequence; and     determining the comprehensive score of the candidate material by combining the similarity, the sequence correlation score and the sequence consistency score.

7. The method according to claim 6, wherein obtaining the sequence correlation score between the third sequence and the fourth sequence and the sequence consistency score of the third sequence comprises:

determining the sequence correlation score and the sequence consistency score using a pre-trained arrangement model based on the third sequence and the fourth sequence.

8. The method according to claim 5, wherein determining the target materials corresponding to the target sentence to be processed based on the sorting result comprises:

taking top L candidate materials after sorting as target materials corresponding to the target sentence to be processed, where L is a positive integer, the value of L is a fixed value, or the value of L is determined according to the principle that the total duration of selected target materials matches the text-to-speech, TTS, audio duration of the target sentence to be processed.

9. The method according to claim 1, wherein generating the target video based on the target materials corresponding to the target sentences respectively comprises: rendering the target video using Fast Forward Moving Picture Experts Group technology based on the target materials.

10. The method according to claim 7, wherein the arrangement model is trained in any training batch with training samples corresponding to a correlation category task and training samples corresponding to a consistency category task respectively, wherein the correlation category task and the consistency category task are both tasks corresponding to the arrangement model.

11. The method according to claim 10, wherein the training samples corresponding to the correlation category task and the training samples corresponding to the consistency category task are obtained by:

obtaining P text-video pairs corresponding to the batch, where P is a positive integer greater than one, each text-video pair comprises: a text collection composed of at least two sentences and a video collection composed of at least two video shots, the at least two sentences come from the same text information and are arranged in order of positions in the text information from first to last, each sentence in the text collection corresponds to at least one video shot in the video collection, and the video shots in the video collection are arranged in order of playback time from first to last; and     constructing the training samples corresponding to the correlation category task and the training samples corresponding to the consistency category task based on the text-video pairs obtained.

12. The method according to claim 11, wherein constructing the training samples corresponding to the correlation category task comprises:

taking the text-video pairs obtained as positive samples;

for any obtained text-video pair, randomly selecting k1 video shots from other text-video pairs, where k1 is a positive integer and less than the number of video shots in the video collection of the text-video pair, inserting the selected k1 video shots into the video collection of the text-video pair to obtain a modified video collection, composing a negative sample using the text collection of the text-video pair and the modified video collection, or, for any text-video pair, randomly selecting k2 sentences from other text-video pairs, where k2 is a positive integer and less than the number of sentences in the text collection of the text-video pair, inserting the selected k2 sentences into the text collection of the text-video pair to obtain a modified text collection, composing a negative sample using the modified text collection and the video collection of the text-video pair; and     taking the positive samples and the negative samples as the training samples corresponding to the correlation category task.

13. The method according to claim 11, wherein constructing the training samples corresponding to the consistency category task comprises:

for each obtained text-video pair, randomly selecting one of the following three predetermined methods to process video collection thereof: keeping the video collection unchanged; randomly selecting k3 video shots from other text-video pairs, where k3 is a positive integer and less than the number of video shots in the video collection, replacing k3 video shots in the video collection with the selected k3 video shots; or randomly adjusting the arrangement order of some video shots in the video collection; and     taking the text-video pairs processed according to the predetermined method as the training samples corresponding to the consistency category task.

14. An electronic device, comprising:

at least one processor; and a memory communicatively connected to the at least one processor; and the memory stores instructions executable by the at least one processor, which, when executed by the at least one processor, cause the at least one processor to execute a video generation method comprising:

obtaining text information to be processed, and segmenting the text information to be processed into sentences to obtain target sentences;

selecting video shots matching the target sentences respectively from video shots in a material library as candidate materials corresponding to the target sentences respectively by     for any one target sentence, performing the following processing: obtaining a text encoding of the target sentence, obtaining similarities between respective video encodings of the video shots in the material library and the text encoding respectively, taking Q video shots with the highest similarities as the candidate materials corresponding to the target sentence, where Q is a positive integer greater than one;

for the target sentences, performing the following processing respectively:

determining a screening method corresponding to a target sentence according to a position of the target sentence in the text information to be processed, selecting a target material for generating a required target video from the candidate materials corresponding to the target sentence according to the screening method by sorting the target sentences according to an order of their positions in the text information to be processed from first to last;

traversing the target sentences sequentially according to the sorting order from first to last, and for each traversed target sentence, performing the following processing:

taking the traversed target sentence as a target sentence to be processed, in response to the target sentence to be processed being a first target sentence after sorting, directly selecting the target material corresponding to the target sentence to be processed from the candidate materials corresponding to the target sentence to be processed;

in response to the target sentence to be processed being not the first target sentence after sorting, selecting the target material corresponding to the target sentence to be processed from the candidate materials corresponding to the target sentence to be processed in consideration of one or more target sentences before the target sentence to be processed and respective target materials corresponding to the one or more target sentences before the target sentence to be processed by, for each candidate material corresponding to the target sentence to be processed, performing the following processing: based on a first sequence and a second sequence latest obtained, generating a third sequence and a fourth sequence corresponding to the candidate material, wherein the first sequence comprises: respective video encodings of target materials corresponding to the one or more target sentences before the target sentence to be processed, the second sequence comprises: respective text encodings of the one or more target sentences before the target sentence to be processed, the third sequence is obtained by adding the video encoding of the candidate material to the end of the first sequence, and the fourth sequence is obtained by adding the text encoding of the target sentence to be processed to the end of the second sequence, and determining a comprehensive score of the candidate material based on the third sequence and the fourth sequence;

sorting the candidate materials according to the order of comprehensive scores from high to low, determining the target material corresponding to the target sentence to be processed based on a sorting result, and adding the video encoding of the target material corresponding to the target sentence to be processed to the end of the first sequence to obtain an updated first sequence, and adding the text encoding of the target sentence to be processed to the end of the second sequence to obtain an updated second sequence; and generating the target video based on the target materials corresponding to the target sentences respectively.

15. A non-transitory computer-readable storage medium comprising computer instructions, which, when executed by a computer, cause the computer to carry out a video generation method comprising:

obtaining text information to be processed, and segmenting the text information to be processed into sentences to obtain target sentences;

selecting video shots matching the target sentences respectively from video shots in a material library as candidate materials corresponding to the target sentences respectively by, for any one target sentence, performing the following processing: obtaining a text encoding of the target sentence, obtaining similarities between respective video encodings of the video shots in the material library and the text encoding respectively, taking Q video shots with the highest similarities as the candidate materials corresponding to the target sentence, where Q is a positive integer greater than one;

for the target sentences, performing the following processing respectively:

determining a screening method corresponding to a target sentence according to a position of the target sentence in the text information to be processed, selecting a target material for generating a required target video from the candidate materials corresponding to the target sentence according to the screening method by, sorting the target sentences according to an order of their positions in the text information to be processed from first to last;

traversing the target sentences sequentially according to the sorting order from first to last, and for each traversed target sentence, performing the following processing:

taking the traversed target sentence as a target sentence to be processed, in response to the target sentence to be processed being a first target sentence after sorting, directly selecting the target material corresponding to the target sentence to be processed from the candidate materials corresponding to the target sentence to be processed;

in response to the target sentence to be processed being not the first target sentence after sorting, selecting the target material corresponding to the target sentence to be processed from the candidate materials corresponding to the target sentence to be processed in consideration of one or more target sentences before the target sentence to be processed and respective target materials corresponding to the one or more target sentences before the target sentence to be processed by, for each candidate material corresponding to the target sentence to be processed, performing the following processing: based on a first sequence and a second sequence latest obtained, generating a third sequence and a fourth sequence corresponding to the candidate material, wherein the first sequence comprises: respective video encodings of target materials corresponding to the one or more target sentences before the target sentence to be processed, the second sequence comprises: respective text encodings of the one or more target sentences before the target sentence to be processed, the third sequence is obtained by adding the video encoding of the candidate material to the end of the first sequence, and the fourth sequence is obtained by adding the text encoding of the target sentence to be processed to the end of the second sequence, and determining a comprehensive score of the candidate material based on the third sequence and the fourth sequence;

sorting the candidate materials according to the order of comprehensive scores from high to low, determining the target material corresponding to the target sentence to be processed based on a sorting result, and adding the video encoding of the target material corresponding to the target sentence to be processed to the end of the first sequence to obtain an updated first sequence, and adding the text encoding of the target sentence to be processed to the end of the second sequence to obtain an updated second sequence; and generating the target video based on the target materials corresponding to the target sentences respectively.

* * * * *